(No Model.)

E. ROBINSON.
COFFEE POT OR URN.

No. 276,473. Patented Apr. 24, 1883.

Attest
Jno. S. Jones
Adolph Gluchowsky

Inventor
Edgar Robinson,
by Wood & Boyd,
his Attorneys &c.

UNITED STATES PATENT OFFICE.

EDGAR ROBINSON, OF CINCINNATI, OHIO.

COFFEE POT OR URN.

SPECIFICATION forming part of Letters Patent No. 276,473, dated April 24, 1883.

Application filed September 6, 1882. (No model.) Patented in Canada September 13, 1881, No. 29,516.

*To all whom it may concern:*

Be it known that I, EDGAR ROBINSON, a citizen of the United States, and a resident of Cincinnati, in the county of Hamilton and State of Ohio, have invented certain new and useful Improvements in Coffee Pots or Urns, of which the following is a specification.

My invention relates to coffee pots or urns, and other cooking-vessels, and has for its objects to provide a water-seal on the under side of the top or cover to prevent the escape of steam and the aroma, and to provide novel means for holding and suspending a sack or coffee-holder within the pot or vessel. These objects I accomplish by the means illustrated in the accompanying drawings, in which—

Figure 1:
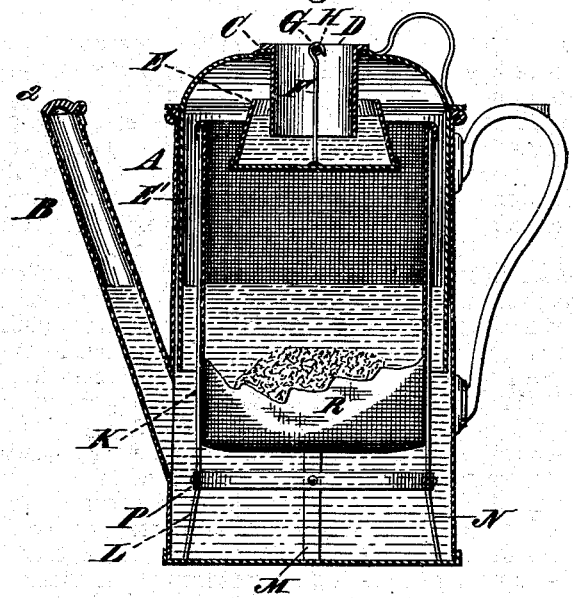
Figure 2:
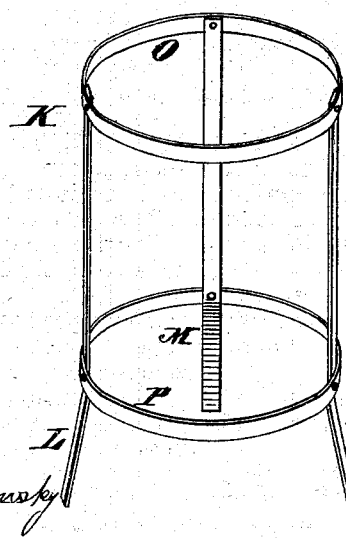

Figure 1 is a central vertical section of my invention. Fig. 2 is a perspective view of the coffee-sack-supporting frame.

A shows the main vessel or coffee-holder, having a spout, B, with a stopper, a.

C represents an annular opening in the top or cover of the vessel. To the edges of this opening is attached one end of a tube, D, so that the tube depends from the top or cover.

E' represents an elongated cylindrical flange of the cover.

E represents a water-seal cup.

F represents a central suspending-rod rigidly attached to the water-seal cup E.

G represents a hook or loop formed on the top of rod F.

H represents a cross-bar or bridge, on which cup E is suspended by means of hook G. This cup is filled with water, and the bottom end of tube D is always immersed below the water-level. Cup E is made considerably larger in diameter than the depending tube C, so that the tilting of the coffee-pot will allow the suspended cup E to swing without tilting or spilling out the water, which will destroy the water-seal.

I represents the cover of the vessel, and the tube D and water-seal cup E are removed with the cover.

K represents a rack or stand, which is provided with three or more legs, L M N, which are held and secured in position by means of hoops O P.

R represents a sack or coffee-holder, arranged in position between the legs of the rack-stand at a suitable point to be immersed in the liquid for making the coffee, the upper edge of the sack being attached to the top hook, O, of the legs, so as to be suspended therefrom. It is preferably made of drilling, toweling, or other fibrous material, the interstices between the filaments of which readily allow the percolation of the water through the sack, but yet sufficiently fine to prevent the escape of powdered coffee.

The operation of making coffee is as follows: The coffee is placed within the sack R, and the rack-stand is inserted in the boiler-vessel, and a sufficient amount of water is added to boil the coffee. The lid, with the attached water-seal, is placed in position as shown in the drawings, and the cup E filled with water, serving as an effectual water-seal, preventing the escape of steam or aroma. The cup E being filled with cold water, it serves as a partial condenser of the steam arising from the boiling water beneath.

It is obvious that this may be used to cook vegetables or other articles of food as well as drawing tea or coffee. The drawings show the devices used as a coffee-pot.

I claim—

1. The combination, with the pot or vessel, of a lid or cover having an orifice, a depending tube having its upper end secured around the edges of the orifice, and a suspended swinging vessel, into which the lower end of the tube projects to form a water-seal, substantially as described.

2. A coffee-pot composed essentially of the cylindrical boiler-vessel A, the cylindrical cover with the depending tube E, the depending tube D, the swinging vessel, into which the tube projects to form a water-seal, and the coffee-sack holder, constructed and combined substantially as herein set forth.

In testimony whereof I have hereunto set my hand in the presence of two subscribing witnesses.

EDGAR ROBINSON.

Witnesses:
JNO. E. JONES,
ADOLPH GLUCHOWSKY.